United States Patent [19]
Ellison

[11] Patent Number: 5,452,537
[45] Date of Patent: Sep. 26, 1995

[54] FISHING LURE RETRIEVER

[76] Inventor: Harold A. Ellison, Jr., 1818 Hemlock, Garland, Tex. 75041

[21] Appl. No.: 218,242

[22] Filed: Mar. 28, 1994

[51] Int. Cl.⁶ ................................................ A01K 97/00
[52] U.S. Cl. ................................................ 43/17.2
[58] Field of Search ................................ 43/17.2

[56] References Cited

U.S. PATENT DOCUMENTS

| | | | |
|---|---|---|---|
| 2,553,173 | 5/1951 | Consolo | 43/17.2 |
| 2,562,413 | 7/1951 | Carr | 43/17.2 |
| 2,758,406 | 8/1956 | Childress | 43/17.2 |
| 3,010,241 | 11/1961 | Terry | 43/17.2 |
| 3,030,046 | 4/1962 | Markoff-Moghadam | 43/21 |
| 3,336,067 | 8/1967 | Cloyd | 43/17.2 |
| 3,805,435 | 4/1974 | Serrill | 43/17.2 |
| 3,987,573 | 10/1976 | Clayton | 43/17.2 |
| 4,085,537 | 4/1978 | Todd | 43/17.2 |
| 4,286,402 | 9/1981 | Kuhn et al. | 43/17.2 |
| 4,408,411 | 10/1983 | Skarnells | 43/17.2 |
| 4,467,547 | 8/1984 | Chabot | 43/17.2 |
| 4,524,536 | 6/1985 | Eckerson | 43/17.2 |
| 4,536,984 | 8/1985 | Kowal | 43/17.2 |
| 4,598,493 | 7/1986 | O'Brien et al. | 43/17.2 |
| 4,756,112 | 7/1988 | Sprague | 43/17.2 |
| 4,766,689 | 8/1988 | Stingr et al. | 43/17.2 |
| 4,885,863 | 12/1989 | Sprague | 43/17.2 |
| 4,930,244 | 6/1990 | Enwiller | 43/17.2 |
| 4,986,022 | 1/1991 | Wilkinson | 43/17.2 |
| 5,081,784 | 1/1992 | Santucci et al. | 43/17.2 |
| 5,209,006 | 5/1993 | Wilhelmer | 43/17.2 |

FOREIGN PATENT DOCUMENTS

| | | | |
|---|---|---|---|
| 805484 | 4/1936 | France | 1/4 |
| 932336 | 8/1946 | France | 1/4 |

*Primary Examiner*—Kurt Rowan
*Attorney, Agent, or Firm*—H. Dennis Kelly; Timmons & Kelly

[57] ABSTRACT

A fishing lure retriever for use in freeing a fishing lure caught on an underwater obstruction has a weighted body connected to a cable which is attached to a reel driven by gears and electric motor. The reel, gears and motor are enclosed in a housing equipped with a cleat for securing the cable. The enclosure also has a hand grip surface for a secure grip. The weighted body is attached to the fishing line, and can slide freely along the line to the lure. The weighted body has short chains attached to it. The reel unwinds the cable to lower the weighted body to the lure. The weighted body strikes the lure, dislodging it from the underwater obstruction, or the chains are made to catch on the hooks attached to the lure. The cable is then secured to the cleat on the enclosure; the combination is then manually pulled to tear the lure loose by brute force.

7 Claims, 3 Drawing Sheets

FISHING LURE RETRIEVER

BACKGROUND OF THE INVENTION

1. Field of the Invention

This invention relates in general to fishing equipment. In particular, the invention relates to accessories for freeing and retrieving fishing lures that are caught on underwater obstructions.

2. Description of the Related Art

Fishing lures that become caught on logs, weeds, and other underwater obstructions are a major impediment to the enjoyment of sport fishing. Often, the lure is expensive and difficult or, if the particular model is no longer in production, impossible to replace. Since some fishermen attach great personal value to their favorite lures, this can make the loss of these lures especially painful.

Numerous devices have been invented to retrieve fishing lures from underwater obstructions. Many make use of variously shaped weighted bodies intended to knock the lure off the underwater obstruction. Some devices also include short chains, such as the structure disclosed in U.S. Pat. No. 4,598,493, issued to O'Brien. These chains are intended to catch one or more of the lure's hooks so that the lure can be pulled loose from the underwater obstruction. These devices generally do not provide a simple and convenient means for playing out, reeling in and storing the cable attached to the retriever. In addition, since the cable used in these devices is played out manually, the retriever can be let out too quickly or unevenly, causing the retriever to disengage from the fishing line or become snarled itself on an underwater obstruction. The cable can also become snarled during retrieval. Since the retriever is being used under circumstances which are already aggravatingly inconvenient, the retriever should introduce as little additional inconvenience as possible.

SUMMARY OF THE INVENTION

The general objective of the invention is to retrieve fishing lures. This objective is obtained by a weighted body having short chains partly imbedded in the weighted body. The weighted body is designed to strike the fishing lure, dislodging it from the underwater object on which it is caught. Alternatively, the chains may be manipulated to catch on the hooks on the fishing lure, enabling the fisherman to pull the lure off the obstruction by brute force.

Another objective of the invention is to attach to the fishing line easily and without using moving parts, yet still provide a secure attachment so the device cannot be accidently shaken off the fishing line. This objective is achieved by a corkscrew attached to a weighted body by a short arm. Once attached to the fishing line, the corkscrew can slide along the line down to the lure. Since the corkscrew is a single piece, the problems which attend small interlocking parts used in a marine environment are avoided.

Yet another objective of the invention is to retrieve the lure with as little inconvenience as possible, and then store away quickly and neatly. This objective is achieved by a reel, drive means for the reel, and an enclosure for the reel and drive means. The drive means rotates the reel to raise and lower a cable attached to a weighted body, which is used to dislodge the lure from the underwater obstruction. The enclosure both provides a convenient hand grip during retrieval, and provides an integral storage area for the cable.

The above, as well as additional objects, features, and advantages of the invention will become apparent in the following detailed description.

DESCRIPTION OF THE PREFERRED EMBODIMENT

Figure 1:
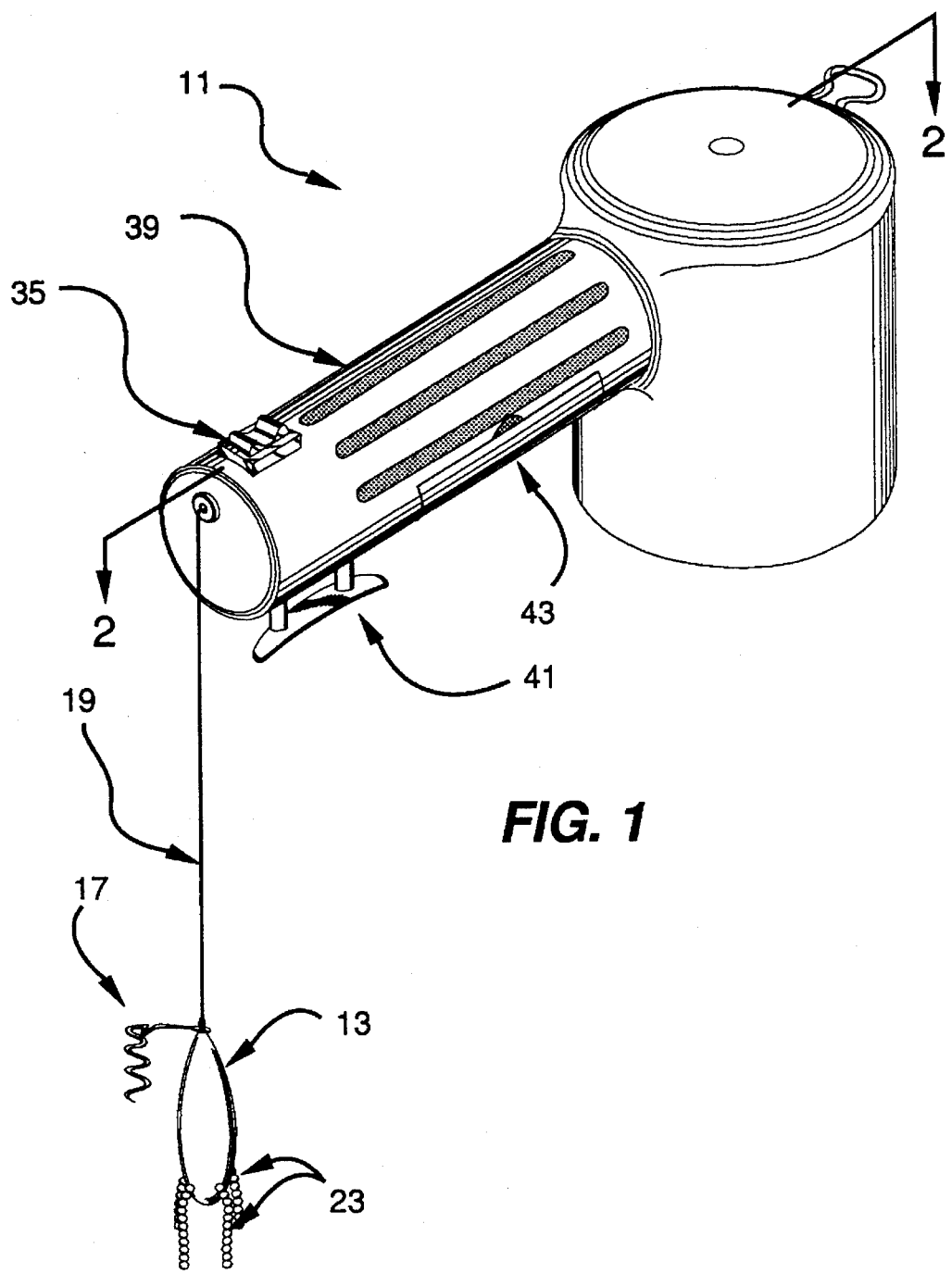
FIG. 1 is a perspective view of the preferred embodiment of a fishing lure retriever of the invention as it appears when assembled.

A preferred embodiment 11 of the fishing lure retriever of the invention is depicted in FIG. 1. A weighted body 13 of at least 4 ounces (113 grams) mass is constructed of a heavy metal such as lead. Alternatively, other heavy materials such as concrete encased in plastic may be used. The weighted body 13 connects to an offset arm 15 which terminates in a corkscrew 17. The corkscrew 17 is about three-eighths inches (10 millimeters) inside diameter and has at least 4 turns.

The weighted body 13 is also connected to a cable 19 by means of an eyehook 21 imbedded in the weighted body 13. The cable 19 is used to lower and raise the weighted body 13. The cable is made of a material with higher tensile strength than the yield strength of a fishing hook.

Four chains 23 are attached to weighted body 13 by imbedding one end of each chain 23 in the weighted body 13, the rest of the chain 23 dangling freely. Each chain 23 is between one and four inches (25 to 102 millimeters) in length. The chains 23 are evenly spaced around the axis of weighted body 13. The chains 23 can be used to retrieve a fishing lure as described below.

Figure 2:
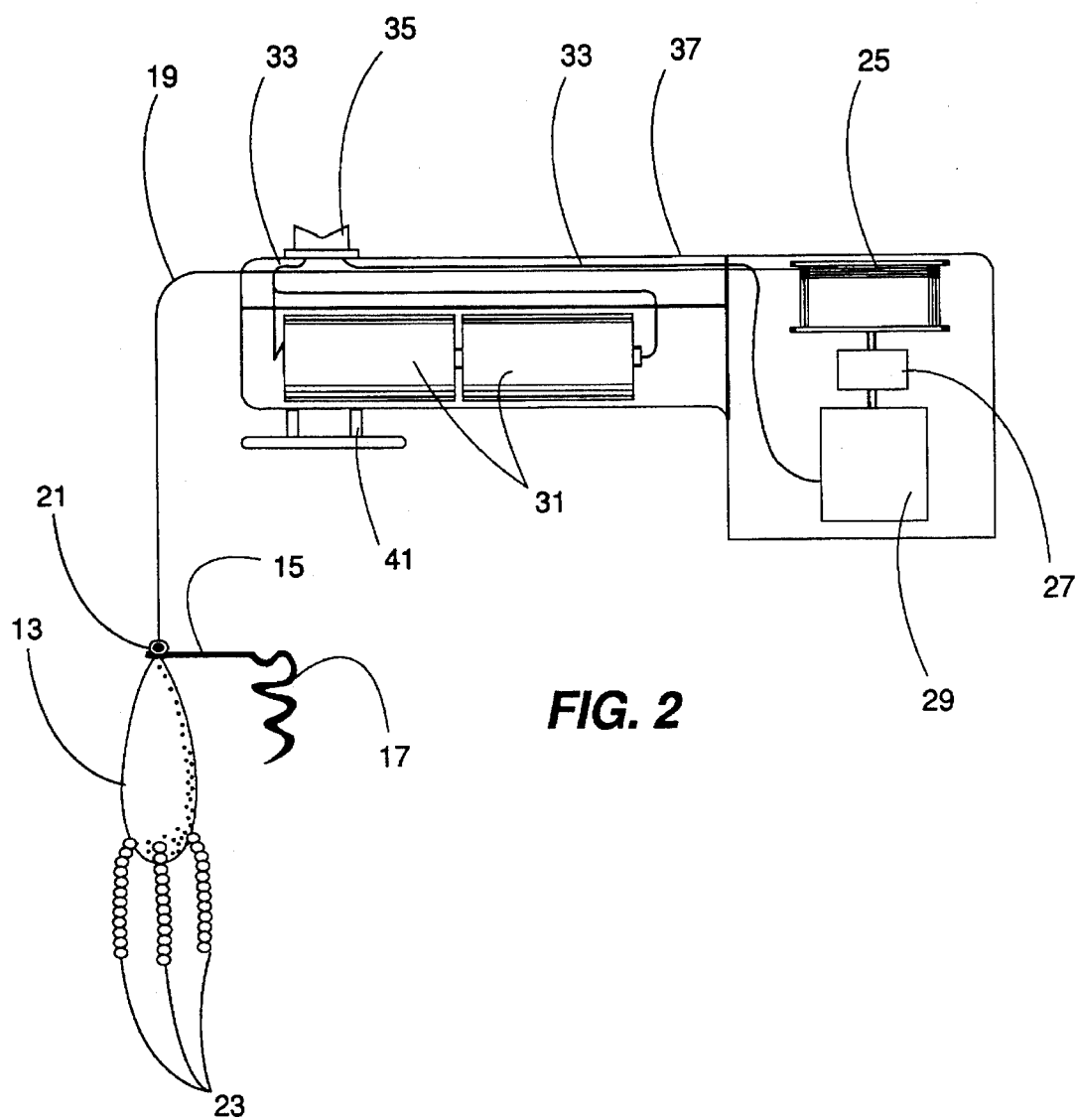
FIG. 2 is a cross sectional side elevational view of the preferred embodiment of a fishing lure retriever of the invention when viewed along reference line 2—2 in FIG. 1.

Turning to FIG. 2, the major elements of the device are illustrated in cross sectional view. The upper end of cable 19 is connected to a reel 25, on which the cable 19 is wound and unwound, for lowering and retrieving weighted body 13. The reel 25 is connected through a gearbox 27 to an electric motor 29. The motor 29 is a direct current (DC) type capable of operating in either the clockwise or counterclockwise direction.

The combination of the electric motor 29 and the gearbox 27 provides the drive means to turn the reel 25 for winding and unwinding the cable 19. An alternative drive means for the reel 25 might be a mechanical system similar to that used on a spinning reel for a fishing pole.

Electrical power for the motor 29 is provided by two C-size batteries 31, connected to the motor 29 through wires 33 and a switch 35. The switch 35 is a three-position (on-center off-on), double-pole, double-throw type with contacts capable of handling the required DC current for the motor 29. The motor 29, the batteries 31, the wires 33 and the switch 35 are connected so that, in one of the on positions, current is supplied to the motor 29 so as to unwind the cable 29, thus lowering weighted body 13. In the other on position, the polarity of the batteries 31 is reversed with respect to the motor 29, causing the cable 19 to wind onto the reel 25.

An enclosure 37 with an integral hand grip surface 39 encloses the motor 29, the batteries 31, and the reel 25. The batteries 31 are contained in the section of the enclosure 37 which makes up the integral hand grip surface 39. In addition to providing the hand grip surface 39, the enclosure 37 provides an attractive appearance for the device and protects the electrical elements from exposure to water. A cleat 41 is attached to enclosure 37 to provide a mooring point for the cable 19. A door 43 on the enclosure 37 allows access to the batteries 31 for replacement.

Figure 3:
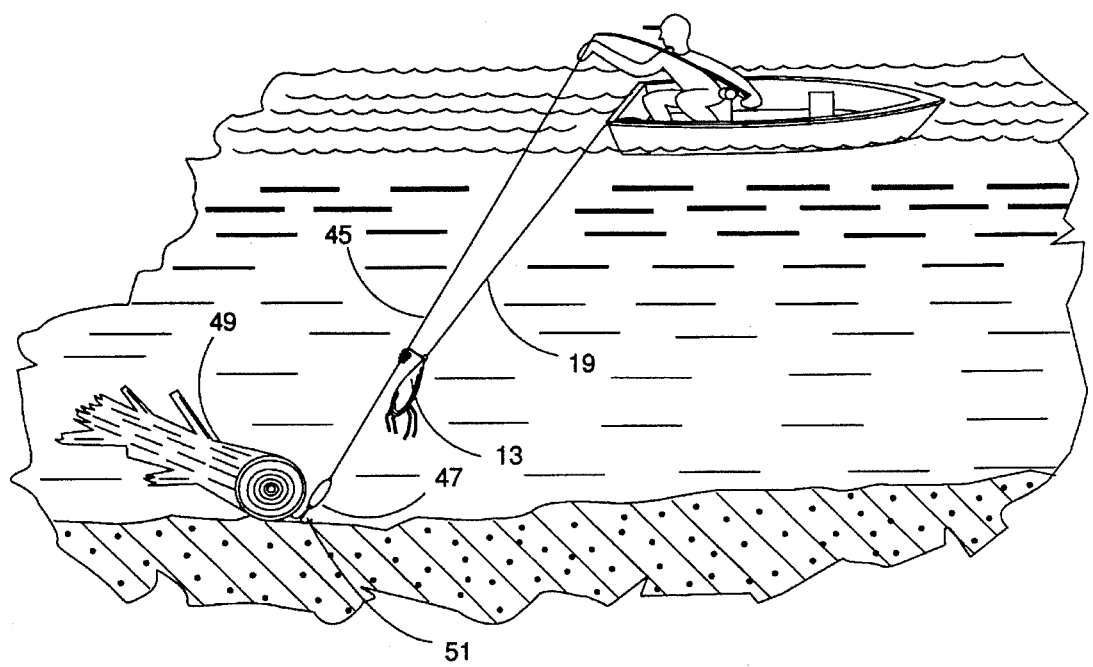
FIG. 3 is a perspective view of the fishing lure retriever of the invention being used to dislodge a fishing lure from an underwater obstruction.

The device is used as depicted in FIG. 3. The fishing line 45 is threaded through corkscrew 17, following the coil of the corkscrew 17 from one end to another, until the fishing line 45 is completely within corkscrew 17. The switch 35 is pushed on so that the cable 19 lowers the weighted body 13 down the fishing line until it reaches the lure 47. The operator then wraps the cable 19 around the cleat 41 and knocks the lure 47 free from the obstruction 49 by pulling up on the cable 19 and releasing it, or by manually raising the enclosure 37 and quickly lowering it. Weighted body 13 will strike the body of lure 47, dislodging the lure's hook 51 from the obstruction 49.

An alternative method for freeing the lure 47, which can be employed if the above stated method fails to free the lure 47, is to manipulate the cable 19 so that the hook 51 will grasp one of the chains 23 on the weighted body 13. The operator can then pull upward on the enclosure 37 with sufficient force to tear the hook 51 free of the obstruction 49. The operator can then retrieve the weighted body 13 by unwrapping the cable 19 from cleat 41 and pushing the switch 35 to rewind the cable 19. After retrieving the weighted body 13, the operator can retrieve the lure 47. All the elements from the enclosure 37 and cleat 41 to the chains 23 should have greater yield strength than the lure hook 51.

The invention has been shown in only one embodiment. It should be apparent to those skilled in the art that the invention is not so limited, but is susceptible to various changes and modifications without departing from the spirit of the invention.

I claim:

1. A fishing lure retriever for freeing a fishing lure connected to a fishing line and caught on an underwater obstruction, the fishing lure retriever comprising:

a weighted body;

attachment means for attaching the weighted body to the fishing line capable of sliding freely along the fishing line;

a cable attached to the weighted body;

a reel on which the cable winds and unwinds;

drive means comprising an electric motor, batteries, wires and a switch for rotating the reel in either direction;

an enclosure surrounding the reel and drive means; and a cleat attached to the enclosure on which to secure the cable for manually pulling on the cable.

2. A fishing lure retriever for freeing a fishing lure connected to a fishing line and caught on an underwater obstruction, the fishing lure retriever comprising:

a weighted body;

an offset arm attached to the weighted body and ending in a corkscrew for attaching the weighted body to the fishing line, the corkscrew being capable of sliding freely along the fishing line;

a cable attached to the weighted body;

a reel on which the cable winds and unwinds;

drive means for rotating the reel;

an enclosure surrounding the reel and drive means; and a cleat attached to the enclosure on which to secure the cable for manually pulling on the cable.

3. A fishing lure retriever for freeing a fishing lure connected to a fishing line and caught on an underwater obstruction, the fishing lure retriever comprising:

a weighted body;

an offset arm attached to the weighted body and ending in a corkscrew for attaching the weighted body to the fishing line, the corkscrew being capable of sliding freely along the fishing line;

a cable attached to the weighted body;

a reel on which the cable winds and unwinds;

drive means for rotating the reel;

an enclosure surrounding the reel and drive means; and a cleat attached to the enclosure on which to secure the cable for manually pulling on the cable.

4. A fishing lure retriever as recited in claim 3, wherein the weighted body further comprises a plurality of dangling chains adapted to attach to a hook on the fishing lure.

5. A fishing lure retriever as recited in claim 3, wherein the weighted body is made of lead.

6. A fishing lure retriever as recited in claim 3, wherein the drive means is an electric motor, batteries, wires and a switch.

7. A fishing lure retriever as recited in claim 6, further comprising a gearbox between the electric motor and the reel.

* * * * *